United States Patent [19]

Fukunaga et al.

[11] Patent Number: 4,934,732

[45] Date of Patent: Jun. 19, 1990

[54] ACTIVELY CONTROLLER SUSPENSION SYSTEM FOR AUTOMOTIVE VEHICLE FOR CONTROLLING SUSPENSION CHARACTERISTICS WITH VEHICULAR SPEED DEPENDENT VARIABLE DAMPING CHARACTERISTICS

[75] Inventors: Yukio Fukunaga; Naoto Fukushima; Yohsuke Akatsu; Sunao Hano; Masaharu Satoh, all of Kanagawa, Japan

[73] Assignee: Nissan Motor Company, Limited, Yokohama, Japan

[21] Appl. No.: 254,645

[22] Filed: Oct. 7, 1988

[51] Int. Cl.$^5$ .................. B60G 11/26; B60G 17/00
[52] U.S. Cl. ........................... 280/707; 188/314; 267/64.21; 280/709; 280/714
[58] Field of Search ............... 280/707, 6.1, 711, 714; 267/218, 217, 64.21; 188/314

[56] References Cited

U.S. PATENT DOCUMENTS

| | | | |
|---|---|---|---|
| 3,029,089 | 4/1962 | Nashman | 280/124 |
| 3,124,368 | 3/1964 | Corlev | 280/6 |
| 4,368,900 | 1/1983 | Beusse | 280/707 |
| 4,696,483 | 9/1987 | Takizawa et al. | 280/707 |
| 4,700,972 | 10/1987 | Young | 280/707 |
| 4,702,490 | 10/1987 | Yamaguchi et al. | 280/707 |
| 4,706,787 | 11/1987 | Wossner | 280/707 |
| 4,743,000 | 5/1988 | Karnopp | 280/707 |

FOREIGN PATENT DOCUMENTS

| | | |
|---|---|---|
| 027869 | 5/1981 | European Pat. Off. . |
| 0193124 | 9/1986 | European Pat. Off. . |
| 197317 | 10/1986 | European Pat. Off. . |
| 249209 | 12/1987 | European Pat. Off. . |
| 249246 | 12/1987 | European Pat. Off. . |
| 249290 | 12/1987 | European Pat. Off. . |
| 283004 | 9/1988 | European Pat. Off. . |
| 284053 | 9/1988 | European Pat. Off. . |
| 285153 | 10/1988 | European Pat. Off. . |

OTHER PUBLICATIONS

Transportation Electronics: Proceedings of the International Congress on Transportation Electronics, Oct., 1986, pp. 333-338, Wright et al. "The Application of active suspension to high performance road vehicles".

*Primary Examiner*—Richard A. Bertsch
*Attorney, Agent, or Firm*—Foley & Lardner, Schwartz, Jeffery, Schwaab, Mack, Blumenthal & Evans

[57] ABSTRACT

A suspension control system introduces capability of automatically adjusting sensibility of attitude change depending upon a vehicular speed with maintaining capability of manual adjustment of the sensibility for the vehicular attitude change. The actively controlled suspension system employs a pressure control valve which is operable in response to a control signal and controls fluid pressure in the fluid chamber of a hydraulic cylinder as a replacement of the conventional hydraulic shock absorber. The pressure control valve is associated with a controller which detects bounding and rebounding acceleration and stroke speed in bounding and rebounding motion for detecting vehicular attitude change and deriving a control signal to operate the pressure control valve to suppress attitude change. The controller is response to a vehicle speed indicative parameter for adjusting sensitivity of attitude change and whereby adjusting suspension control characteristics.

20 Claims, 7 Drawing Sheets

ACTIVELY CONTROLLER SUSPENSION SYSTEM FOR AUTOMOTIVE VEHICLE FOR CONTROLLING SUSPENSION CHARACTERISTICS WITH VEHICULAR SPEED DEPENDENT VARIABLE DAMPING CHARACTERISTICS

BACKGROUND OF THE INVENTION

1. Field of the Invention

The present invention relates generally to an actively controlled suspension system having variable of suspension characteristics adapted to vehicular driving conditions for achieving both riding comfort and driving stability. More specifically, the invention relates to an actively controlled suspension system which has variable suspension characteristics depending upon the vehicular driving condition. Further particularly, the invention relates to an actively controlled suspension system which has variable of damping characteristics depending upon the vehicular driving speed for providing satisfactory riding comfort and high driving stability as required depending upon the vehicular driving condition.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes a hydraulic cylinder for generating a variable damping force against relative motion of a vehicular suspension member and a vehicle body in bounding and rebounding directions for adjusting suspension characteristics and adjusting vehicle body attitude.

Similar type actively controlled suspension systems has been disclosed in the co-pending U.S. patent application Ser. No. 060,911, filed on Jun. 12, 1987 and assigned to the common assignee to the present invention. Further, European Patent First Publications No. 02 49 246 and 02 49 209 respectively corresponding to co-pending U.S. patent application Ser. No. 061,368 (filed on June 15, 1987) and U.S. patent application Ser. No. 059,888, filed on June 9, 1987, both of which have been assigned to the common assignee to present invention. The later-mentioned three inventions includes features of anti-rolling and/or anti-pitching suspension control for adjusting damping characteristics at respective vehicular wheel for suppressing vehicular rolling motion.

Furthermore, the co-pending U.S. patent application Ser. No. 169,201, filed on Mar. 16, 1988, corresponding to the European patent application published under European Patent First Publication No. 0 283 044, co-pending U.S. patent application Ser. No. 176,246, filed on Mar. 31, 1988, corresponding to the European patent application published under European Patent First Publication No. 0 285 153 and the co-pending U.S. patent application Ser. No. 172,419, filed on Mar. 24, 1988, corresponding to the European patent application published under European Patent First Publication No. 0 284 053 have been assigned to the common assignee of the present invention. These co-pending applications disclose actively controlled suspension systems which provide variable suspension characteristics with variable sensibility for vehicular body attitude change.

Such suspension control systems will provide wider flexibility in controlling suspension characteristics and can fit the stiffness level for the drivers' taste. In this sense, the afore-mentioned three inventions are successful in achieving the variable suspension characteristics depending upon vehicle driving condition. However, it would be more desirable to incorporate automatic suspension characteristics adjustment in certain aspect for assuring not only driving stability but only riding comfort.

On the other hand, the conventional active suspension control has been discussed in Proceeding Institution of Mechanical Engineering (Britain) Vol. 185, page 558. Such active suspension control, as discussed, controls vibration transmission ratio between the suspension member and the vehicle body on the basis of a bounding and rebounding acceleration. In the disclosed control, the pressure control valve is controlled for varying fluid path area for changing pressurized fluid supply rate and drain rate for generating damping force against the input shock. For example, assuming input vibration force $X_1$ is exerted on the suspension member. The piston in the hydraulic cylinder is driving in bounding and/or rebounding direction to cause change of fluid pressure in the hydraulic cylinder. According to this, the working fluid in the fluid chamber communicated with the pressure control valves varies at a speed determined by fluid path area in the pressure control valve. Since the pressure control valve has a throttle for limiting working fluid flow rate, the damping force $X_2$ is generated in the hydraulic cylinder. Therefore, the vibration transmission ratio becomes $X_2/X_1$.

However, in such conventional actively controlled suspension system, the flow-control type servo valve has been employed for controlling the pressure in the hydraulic cylinder. Since such flow-control type servo valve controls working fluid flow rate instead of the working fluid pressure per se, accurate suspension control cannot be achieved unless the vibration transmission ratio is determined in complex manner in relation to the fluid flow rate variation and the corresponding pressure change. This requires substantial capacity and high process speed for the controller to satisfactorily control the suspension in active manner. However, microprocessors for mounting the automotive vehicle has less capacity and process speed than that required for performing active suspension control.

In addition, as will be appreciated, the vehicle body and the suspension member vibrates in various vibration modes, such as pitching mode, rolling mode, bounding mode and so forth. Therefore, as long as suspension control is performed based on the bounding and rebounding acceleration at single point on the vehicle, suspension control covering all of the vibration modes cannot be accomplished.

In order to improve the aforementioned drawback in the prior art, co-pending U.S. patent application Ser. No. 059,888, filed on Jun. 9, 1987, corresponding to the European patent application published under European Patent First Publication No. 0 249 290, proposes an actively controlled suspension system employing a pressure control valve which is operable in response to a control signal and controls fluid pressure in the fluid chamber of a hydraulic cylinder as a replacement of the conventional hydraulic shock absorber. The pressure control valve is associated with a controller which detects bounding and rebounding acceleration and stroke speed in bounding and rebounding motion for deriving a control signal to operate the pressure control valve to absorb vibration energy to be transmitted between a vehicle body and a suspension member.

The prior proposed suspension control system facilitates flexibility in adjustment of the suspension characteristics so that the suspension characteristics may fit the driver's feeling. However, it would be desirable to provide the capability of automatic adjustment of the suspension characteristics in certain vehicle driving condition.

SUMMARY OF THE INVENTION

In view of the aforementioned prior proposals, it is the principle object of the present invention is to provide an improvement of the aforementioned actively controlled suspension systems which allow the drivers to manually select desired suspension characteristics.

Another object of the invention is to provide an actively controlled suspension system which introduces a feature of automatic adjustment of suspension control characteristics depending upon the vehicular driving condition, in addition to the capability of manual selection.

In order to accomplish aforementioned and other objects, a suspension control system, according to the present invention, introduces capability of automatically adjusting sensibility of attitude change depending upon a vehicular speed with maintaining capability of manual adjustment of the sensibility for the vehicular attitude change. The actively controlled suspension system employs a pressure control valve which is operable in response to a control signal and controls fluid pressure in the fluid chamber of a hydraulic cylinder as a replacement of the conventional hydraulic shock absorber. The pressure control valve is associated with a controller which detects bounding and rebounding acceleration and stroke speed in bounding and rebounding motion for detecting vehicular attitude change and deriving a control signal to operate the pressure control valve to suppress attitude change. The controller is response to a vehicle speed indicative parameter for adjusting sensitivity of attitude change and whereby adjusting suspension control characteristics.

According to one aspect of the invention, an actively controlled suspension system for an automotive vehicle comprises:
- a suspension assembly including a variable pressure chamber filled with a working fluid;
- a pressure source connected to the variable pressure chamber for supplying the pressurized working fluid;
- a pressure adjusting means, interposed between the variable pressure chamber and the pressure source, for adjusting fluid pressure in the variable pressure chamber;
- a first sensor means for monitoring vehicular attitude for producing a vehicular attitude indicative signal;
- a second sensor means for monitoring a pre-selected vehicular driving condition indicative parameter to produce a vehicular driving condition indicative signal; and
- a controller receiving the vehicular attitude indicative signal for deriving a first control parameter representative an acceleration in attitude change and a second control parameter representative of a stroke speed in attitude change on the basis of the vehicular attitude indicative signal, modifying at least one of the first and second control parameters depending upon the vehicular driving condition indicative signal value, and deriving a control signal to suppress attitude change of the vehicle for controlling the pressure adjusting means on the basis of a target vehicular height, the first control parameter and the modified second control parameter.

According to another aspect of the invention, an actively controlled suspension system for an automotive vehicle comprises:
- a suspension assembly provided for suspending a vehicle body on each vehicular wheel, the suspension assembly including a variable pressure chamber filled with a working fluid;
- a pressure source connected to the variable pressure chamber for supplying the pressurized working fluid;
- a pressure adjusting means, interposed between each of the variable pressure chamber and the pressure source, for adjusting fluid pressure in the variable pressure chamber;
- first sensor means for monitoring essentially vertical motion of each suspended section where one of the vehicular wheels is provided, the sensor means producing a vertical motion indicative signals respectively indicative of vertical motions of respective suspended sections;
- second sensor means for monitoring a vehicle driving speed for producing a vehicle speed indicative signal having a value representative of the monitored vehicle speed; and
- a controller receiving the vertical motion indicative signal for deriving a first control parameters based on respective vertical motion indicative signals and a first coefficient and a second control parameters based on respective vertical motion indicative signals and a second coefficient, the controller modifying the second coefficient on the basis of the vehicle speed indicative signal value, and the controller deriving a control signals to suppress vertical motion at respectively corresponding suspended sections of the vehicle for controlling the pressure adjusting means to adjust pressure in respective variable pressure chambers.

Each of the suspension assembly includes a suspension member rotatably supporting the vehicular wheel, and each of the variable pressure chamber is disposed between the suspension member and the corresponding one of suspended sections of the vehicle body, and wherein the variable pressure chamber is variable of the fluid pressure therein in response to relatively high frequency vibration input from the suspension member in order to absorb vibration energy. The sensor means is provided on the vehicle body for monitoring an acceleration of bounding and rebounding motion of the vehicle body for producing a bounding and rebounding motion acceleration indicative signal as the vehicular attitude indicative signal.

The controller derives a bounding and rebounding motion speed based on the bounding and rebounding acceleration indicative signal values for detecting bonding and rebounding motion at respective suspended sections of the vehicle body and detects the vehicular attitude change based on the bounding and rebounding acceleration and the bounding and rebounding motion speed for deriving the control signals. The controller derives the bounding and rebounding motion speed by integrating the bounding and rebounding acceleration indicative signal value. The controller derives the first control parameter representative a bounding and rebounding acceleration dependent component of the control signal based on the bounding and rebounding acceleration indicative signal value and a given first gain corresponding to the first coefficient and a bounding and rebounding motion speed dependent component of the control signal based on the bounding and rebounding motion speed and a given second gain corresponding to the second coefficient.

The control signal is derived on the basis of a sum of the bounding and rebounding acceleration dependent component and the bounding and rebounding motion speed dependent component and a target vehicular height.

The actively controlled suspension system further comprises a manually operable means for adjusting at least one of the first and second coefficient.

The controller derives the control signals for respective pressure adjusting means independently to each other.

BRIEF DESCRIPTION OF THE DRAWINGS

In the drawings:

FIGS. 3(A) and 3(B) are enlarged sections showing the detail of the hydraulic pressure control valve of FIG. 2, in which, FIG. 3(A) shows the valve position softening the shock absorber and FIG. 3(B) shows the valve position hardening the shock absorber;

DESCRIPTION OF THE PREFERRED EMBODIMENT

Figure 1:
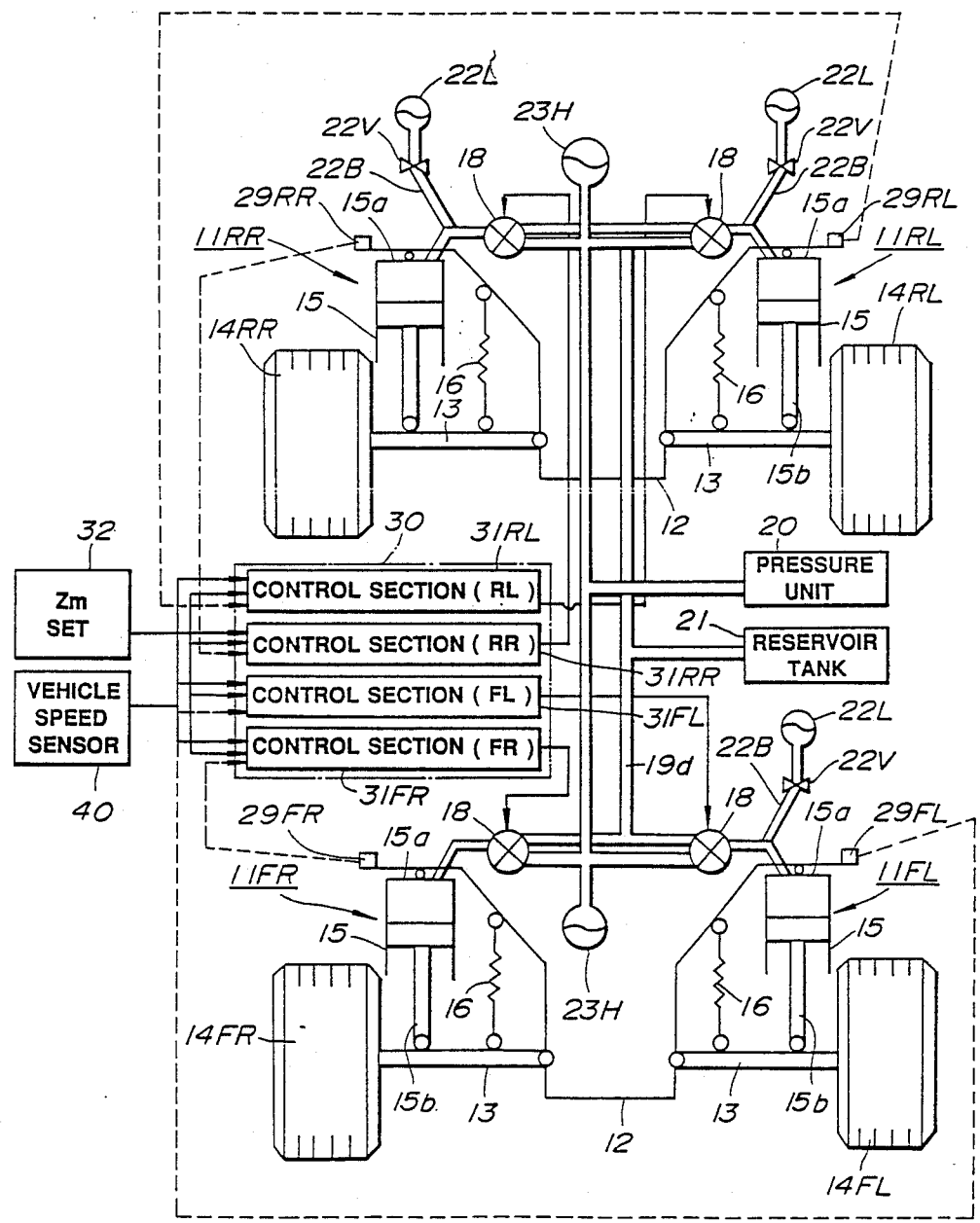
FIG. 1 is a diagrammatical illustration showing the overall construction of the preferred embodiment of an automotive suspension system with a control system actively controlling the suspension system according to the present invention.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator, a coil spring 16.

It should be appreciated that, in the shown embodiment, the coil spring 16 is not necessary to damp dynamic kinematic energy and should resiliently support only static load to be exerted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the other of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a control unit 30. The hydraulic circuit 19 includes a supply line 19s and a drain line 19d. High pressure accumulators 23H are connected to the supply line 19s and low pressure accumulator 22L are connected between the pressure control valves 18 and associated hydraulic cylinder 15. The pressure source unit comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen from FIG. 1, the low pressure accumulators 22L are connected to a branched pressure line 22B connected to a pressure line between the pressure control valves 18 and the upper fluid chamber 15d of the hydraulic cylinder 15A. A throttle valve 22V is inserted between the junction of the branched pressure line 22B and the pressure line and the low pressure accumulator 22L. The throttle valve 22V has a fixed throttling rate.

Figure 2:
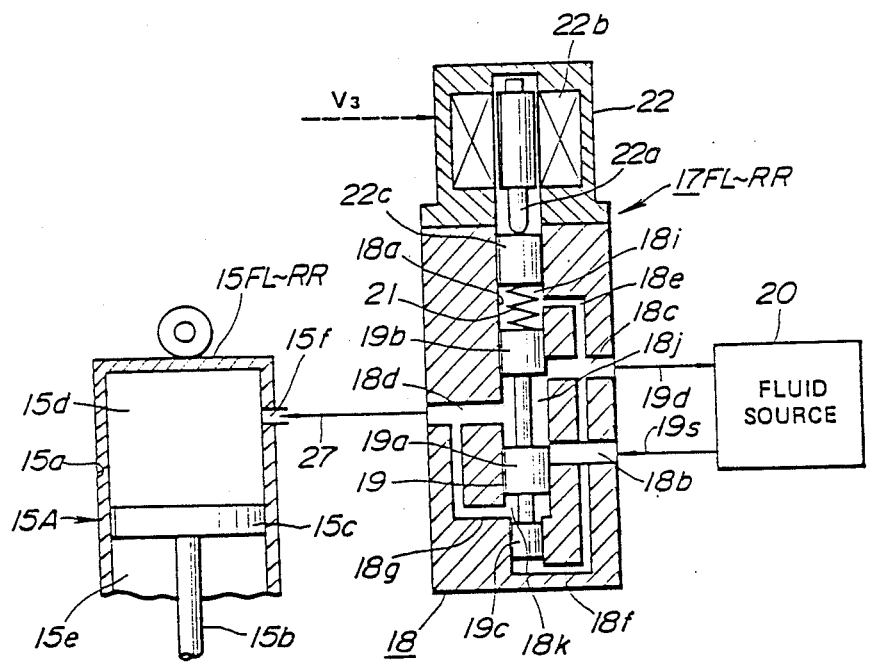
FIG. 2 is a section of one example of a hydraulic shock absorber in combination with a hydraulic pressure control valve associated with the shock absorber for adjusting stiffness of the latter.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, an pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
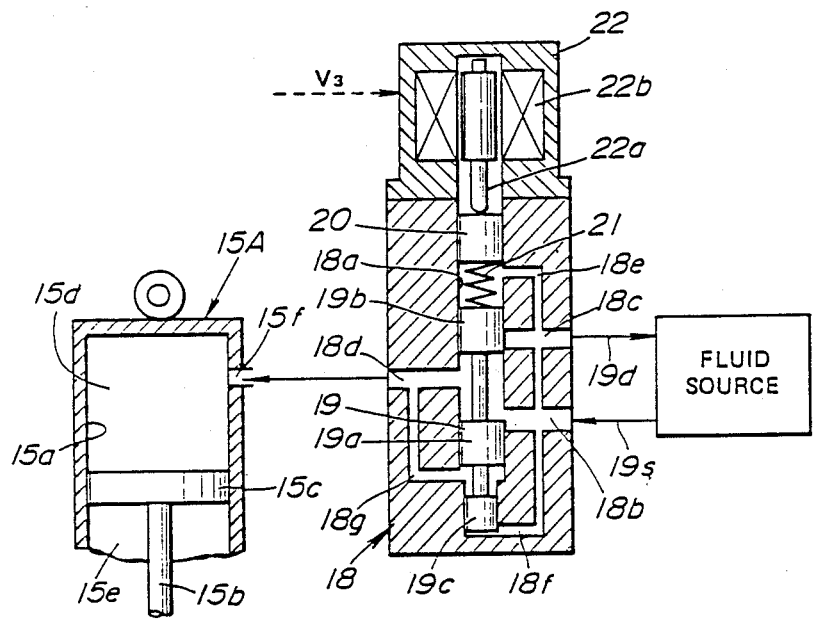
Figure 3:
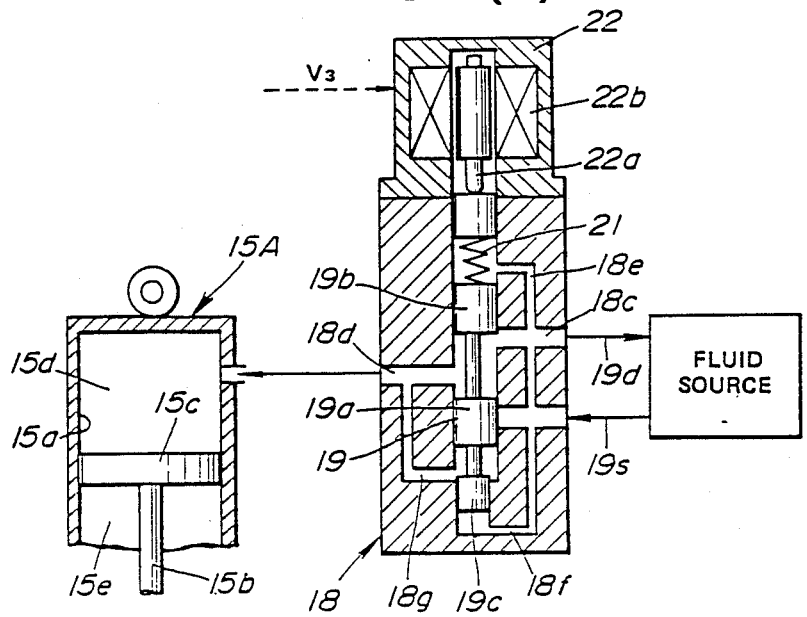

In order to increase the supply pressure of the working fluid, the spool valve 19 is shifted to the position shown in FIG. 3(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 01 03 124 is herein incorporated by reference for the sake of disclosure.

Figure 4:
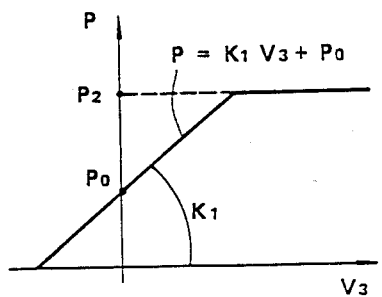
FIG. 4 is a graph showing variation of a hydraulic pressure to be supplied to a pressure control value according to variation of drive signal voltage.

As seen from FIG. 2, the proportioning solenoid 22 comprises the actuator rod 22a and a solenoid coil 22b. The solenoid coil 22b is energized by suspension control signal $V_3$ from the controller 30. In the shown embodiment of the pressure control valve, the working fluid pressure P at the outlet port 18d is variable according to the characteristics shown in FIG. 4. Namely, when the control valve $V_3$ as represented by the suspension control signal is zero, the pressure P at the outlet port 18 becomes $P_0$ determined according to a predetermined offset pressure $P_0$. When the suspension control signal value in positive value increases, the fluid pressure P at the outlet port 18d increases with a predetermined proportioning gain $K_1$. Namely, by increasing of the suspension control valve $V_3$, the actuator rod 22a is driven downwardly in FIG. 2 at a magnitude toward to position of FIG. 3(A) to achieve increasing of the fluid pressure with the predetermined proportioning gain $K_1$. The fluid pressure P at the outlet port 18d saturate at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes being blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as orifice, throttling valve, is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c may serve to allow transmission of the part of bounding energy to the vehicle body to cause rough ride feeling, the shown embodiment of the suspension system may provide satisfactorily high level riding comfort by completely absorbing the bounding and rebounding energy set forth above.

In order to enable the controller 30 to perform suspension control in response to change of attitude of the vehicle body, the preferred embodiment of the active suspension control system employs bounding and rebounding acceleration sensors 29FL, 29FR, 29RL and 29RR. The bounding and rebounding acceleration sensors 29FL, 29FR, 29RL and 29RR are respectively oriented immediately above respectively associated front-left, front-right, rear-left and rear-right wheels 14FL, 14FR, 14RL and 14RR. The bounding and rebounding acceleration sensors 29FL, 29FR, 29RR and 29RL monitors vertical motion acceleration of the associated sections of the vehicle body in bounding and rebounding directions and thus produces bounding and rebounding acceleration indicative sensor signals $\alpha_{FL}$, $\alpha_{FR}$, $\alpha_{RL}$ and $\alpha_{RR}$. The bounding and rebounding acceleration indicative sensor signals $\alpha_{FL}$, $\alpha_{FR}$, $\alpha_{RL}$ and $\alpha_{RR}$ are variable of the signal values depending upon direction of the motion of the associated position of the vehicle body and depending upon the magnitude of the acceleration. In the shown embodiment, the bounding and rebounding acceleration sensors 29FL, 29FR, 29RL and 29RR generate positive bounding and rebounding acceleration indicative sensor signals, the positive value of which is variable depending upon the magnitude of acceleration in bounding direction at respective associated position of the vehicle body. On the other hand, the bounding the rebounding acceleration sensors 29FL, 29FR, 29RL and 29RR produce the bounding and rebounding acceleration indicative sensor signals $\alpha_{FL}$, $\alpha_{FR}$, $\alpha_{RL}$ and $\alpha_{RR}$ with negative value representative of magnitude of rebounding accelerations at respective positions. The controller 30 is further connected to a vehicle speed sensor 40 which monitors vehicle speed to produce a vehicle speed indicative signal V.

Figure 5:
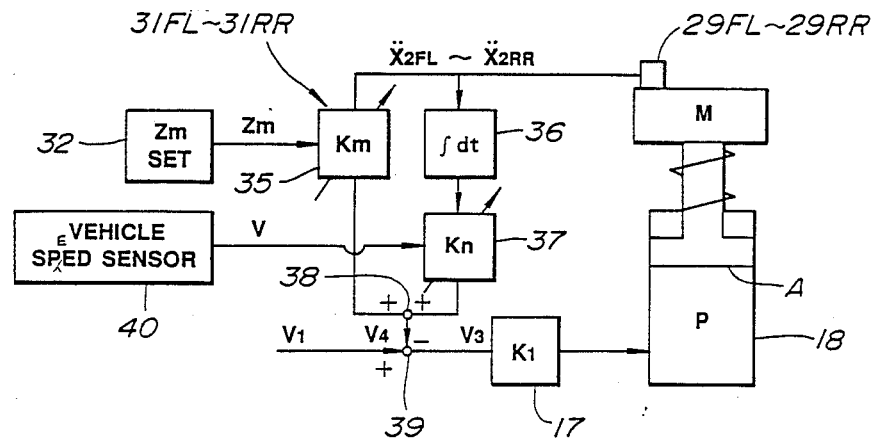
FIG. 5 is a schematic block diagram of the preferred embodiment of the control section in the controller of the active suspension control system according to the invention.
Figure 10:
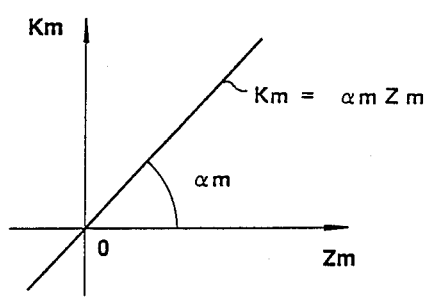
FIG. 10 is a graph showing variation of gain for determining bounding and rebounding acceleration dependent value, in relation to equivalent mass weight of the vehicle body.

In order to facilitate suspension controls for respective front-left, front-right, rear-left and rear-right suspension systems 11FL, 11FR, 11RL and 11RR, independently of each other, the controller 30 is composed of front-left control section 31Fl and rear-right control section 31RR. As shown in FIG. 5, each of the front-left, front-right, rear-left and rear-right control sections 31Fl, 31FR, 31RL and 31RR comprises a gain controlled amplifier 35, an integrator circuit 36, a second gain controlled amplifier 37 and an adder 39. The first gain controlled amplifier 35 and the integrator circuit 36 are connected to corresponding one of the bounding and rebounding acceleration sensors 29FL, 29FR, 29RL and 29RR. The first gain controlled amplifier 35 is also connected to a manually operable gain setting unit 32 which may be provided in the vicinity of a vehicular driver so as to be manually operated for adjusting a gain Km of the gain controlled amplifier. In practice, the first gain controlled amplifier 35 may comprise a voltage controlled variable gain amplifier variable of the gain depending upon a gain control voltage Zm. Variation of the gain Km in relation to the gain controlling voltage signal Zm is shown in FIG. 10. Therefore, the manually operable gain setting unit 32 may comprise a voltage setting unit, such as volume for adjusting the gain controlling voltage. Therefore, the corresponding one of bounding and rebounding acceleration indicative sensor signal $\alpha_{FL}$, $\alpha_{FR}$, $\alpha_{RL}$ and $\alpha_{RR}$ input to the gain controlled amplifier 35 is amplified with the gain Km adjusted through the manually operable gain setting unit 32 to output amplified signal.

As will be appreciated, the amplified signal output from the first gain control signal represents a bounding and rebounding acceleration indicative factor.

Figure 11:
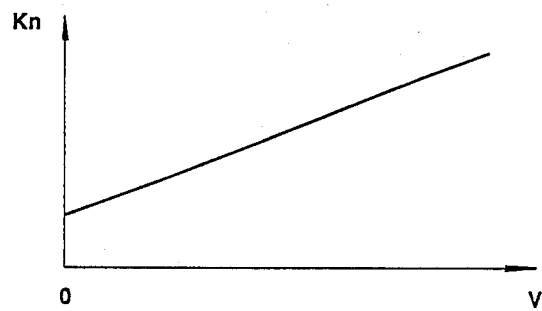
FIG. 11 is a graph showing variation of gain for deriving bounding and rebounding stroke speed dependent value, in relation to spring coefficient of the suspension system.

The integrator circuit 36 is provided in parallel to the first gain controlled amplifier 36 and connected to the second gain controlled amplifier 37 which has a variable gain Kn which varies depending upon the vehicle speed indicative signal value V as shown in FIG. 11. The integrator circuit 36 in each control control sections 31FL, 31FR, 31RL and 31RR receives the bounding and rebounding indicative sensor signal $\alpha_{FL}$, $\alpha_{FR}$, $\alpha_{RL}$ and $\alpha_{RR}$ from associated one of the bounding and rebounding acceleration sensor 29FL, 29FR, 29RL and 29RR to output integrated value $\int \alpha_{FL} dt$, $\int \alpha_{FR} dt$, $\int \alpha_{RL} dt$ and $\int \alpha_{RR} dt$. The second gain controlled amplifier 37 is connected to the vehicle speed sensor 40 to receive therefrom a voltage signal v indicative of the measured vehicle speed, as the gain controlling voltage, to vary the amplifying gain Kn. The second gain controlled amplifier 37 amplifies the integrated value $\int \alpha_{FL} dt$, $\int \alpha_{FR} dt$ with the vehicle speed dependent gain $\int \alpha_{RL} dt$ and $\int \alpha_{RR} dt$ to output the amplified signal.

The amplified signal output from the second gain controlled amplifier has a value representative of a bounding and rebounding stroke speed indicative factor.

The bounding and rebounding acceleration representative amplified signal and the bounding and rebounding stroke speed representative amplified signal of the first and second gain controlled amplifies 35 and 37 are fed to the adder 38. Therefore, adder 38 derives an adder signal $V_4$ to be fed to a comparator 39 which also receives a reference signal $V_1$ representative of a target vehicular height. The comparator 39 derives a difference between the adder signal $V_4$ and the reference signal $V_1$ to produce a control signal $V_3$ having a value corresponding to the derived difference.

In the practical control, while the vehicle travels smoothly or steadily on a smooth road, in straight, vehicular rolling, pitching and bounding will never occur. At this condition, the bounding and rebounding acceleration indicative sensor signal values $\alpha_{FL}$, $\alpha_{FR}$, $\alpha_{RL}$ and $\alpha_{RR}$ of the bounding and rebounding acceleration sensors 29FL, 29FR, 29RL and 29RR are maintained at zero. These zero values of the bounding and rebounding acceleration indicative sensor signals $\alpha_{FL}$, $\alpha_{FR}$, $\alpha_{RL}$ and $\alpha_{RR}$ are input to respectively corresponding front-left, front-right, rear-left and rear-right control sections 31FL, 31FR, 31RL and 31RR. Since the input values are zero, the outputs of the first gain controlled amplifier 35 is maintained zero. Also, the output of the integrator circuit 36 is held zero. Therefore, the suspension control signals $V_{3FL}$, $V_{3FR}$, $V_{3RL}$ and $V_{3RR}$ output from respective adder 39 are held zero.

As set forth, while the suspension control signal value is zero, the proportioning solenoid coil 22b of the proportioning solenoid 22 is energized to provide the offset pressure P₀ to the upper fluid chamber 15d of the hydraulic cylinder 15A via the outlet port 18d.

As set forth, the downward force exerted to the valve spool 19 from the bias spring 22d and the upward hydraulic pressure in the pressure control chamber 18k balances in each pressure control valve 18. At this position, when relatively high frequency and small magnitude bounding and/or rebounding vibration is input from the suspension member, the valve spool 19 vibratingly shifts in a manner set forth above to absorb vibration energy. This successfully prevents the high frequency and small magnitude bounding and rebounding vibration from being transmitted to the vehicle body. Therefore, satisfactorily high riding comfort can be achieved.

On the other hand, when vehicle driving behavior causes substantial change in vehicular attitude to cause rolling, pitching or bounding, respective bounding and rebounding acceleration indicative sensor signal values $\alpha_{FL}$, $\alpha_{FR}$, $\alpha_{RL}$ and $\alpha_{RR}$ vary. Assuming the sensor signal values of respective bounding and rebounding acceleration indicative sensor signals $\alpha_{FL}$, $\alpha_{FR}$, $\alpha_{RL}$ and $\alpha_{RR}$ and $\alpha_{fl}$, $\alpha_{fr}$, $\alpha_{rl}$ and $\alpha_{rr}$, the output values of respective gain deriving stages 32 of the front-left, front-right, rear-left and rear-right control sections 31FL, 31FR, 31RL and 31RR becomes respective $(\alpha_{fl} \times K_M)$, $(\alpha_{fr} \times K_M)$, $(60_{rl} \times K_M)$ and $(\alpha_{rr} \times K_M)$. On the other hand, based on respective bounding and rebounding acceleration indicative sensor signal values $\alpha_{fl}$, $\alpha_{fr}$, $\alpha_{rl}$ and $\alpha_{rr}$, the bounding and rebounding stroke speeds $V_{SFL}$, $V_{SFR}$, $V_{SRL}$ and $V_{SRR}$ are derived through the integrator circuits 36 and the second gain controlled amplifiers 37 in respective control sections 31FL, 31FR, 31RL and 31RR. In practice, respective bounding and rebounding stroke speeds Vs is derived as an integrated value $\int \alpha_{FL} dt$, $\int \alpha_{FR} dt$, $\int \alpha_{RL} dt$ and $\int \alpha_{RR} dt$ of the bounding and rebounding acceleration indicative signal values by the integrator circuits 36. In the second gain controlled amplifiers 37, it is derived the stroke speed dependent value on the basis of the bounding and rebounding stroke speed indicative values $V_{SFL}$, $V_{SFR}$, $V_{SRL}$ and $V_{SRR}$ with the vehicle speed dependent gain Kn. The adder 38 of respective front-left, front-right, rear-left and rear-right control sections 31FL, 31FR, 31RL and 31RR derive sum values serving as the adder signals Vhd 4. Each control section 31FL, 31FR, 31RL and 31RR thus derives the control signals $V_{3RL}$, $V_{3FR}$, $V_{3RL}$ and $V_{3RR}$ for respective pressure control valves 18.

For example, when right-hand steering operation is performed during vehicle travel, leftward centrifugal force may be exerted on the vehicle to cause shifting of gravity center leftwardly. As a result, the left side of the vehicle is lowered and right side is raised to cause vehicular rolling. Therefore, the positive bounding and rebounding acceleration indicative sensor signals $\alpha_{FR}$ and $\alpha_{RR}$ are produced from front-right and rear-right bounding and rebounding acceleration sensors 29FR and 29RR. On the other hand, the negative bounding and rebounding acceleration indicative sensor signals $\alpha_{FL}$ and $\alpha_{RL}$ are output from the front-left and rear-left bounding and rebounding acceleration sensors 29FL and 29RL. The gain derivation stage 32 of respective front-right and rear-right control sections 31FR and 31RR are thus output positive stroke acceleration dependent values. The gain deriving stage 32 of the front-left and rear-left control sections 29FL and 29RR derives the negative stroke acceleration dependent values. Similarly, the arithmetic stages 33 of respective control sections derive bounding and rebounding stroke speed and whereby derives the bounding and rebounding stroke speed dependent values. This bounding and rebounding stroke speed dependent values in the front-right and rear-right control sections 31FR and 31RR are positive and that of the front-left and rear-left control sections 29FL and 29RL become negative. Therefore, the suspension control signals for the front-right and rear-right suspension systems become negative and for the front-left and rear-left suspension systems becomes positive.

In response to the negative suspension control signals for the front-right and rear-right suspension systems, the proportioning solenoid coils 22a of the pressure control valves 18 of the front-right and rear-right suspension systems are energized at reduced magnitude to shift the spool valves for blocking the inlet ports and establishing communication between the fluid chambers 15d and the drain ports 18c. On the other hand, in response to the positive suspension control signals, the solenoid coils 22a of the pressure control valves 18 of the front-left and rear-left suspension systems are energized at increased magnitude for shifting to increase the path area for introducing the pressure into the fluid chambers 15d of the hydraulic cylinders 15A to harden the front-left and rear-left suspension systems. As will be appreciated, with the suspension control set forth above, vehicular rolling can be successfully reduced.

Figure 6:
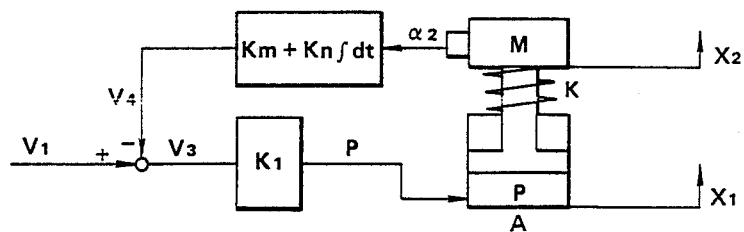
FIG. 6 is a schematic block diagram of a feedback system in the preferred embodiment of the suspension control system of FIGS. 1 to 5.

Here, assuming that:

the mass weight of the vehicle body is M the spring coefficient of the coil spring 16 is K the working fluid pressure in the fluid chamber 15d is P the effective upper surface area of the piston 15c is A the suspension control signal value is $V_4$ a target vehicle height is $V_1$ a difference between the target height $V_1$ and the suspension control signal value $V_4$ is $V_3$, a gain of the pressure control valve 18 is $K_1$, the magnitude of displacement of the suspension member is $x_1$, and magnitude of displacement of the vehicle body is $x_2$, the equivalent circuit to the feedback system of the controller may be illustrated as shown in FIG. 6. The inertia resistance $Mx_2$ of the vehicle body is determined by the resistance component of the coil spring 16 and a resistance component of the hydraulic cylinder 15A and can be illustrated as the following equation (1):

$$Mx_2 = K(x_1 - x_2) + P \cdot A \tag{1}$$

On the other hand, the difference $V_3$ can be illustrated as the following equation (2):

$$V_3 = V_{1-2} \tag{2}$$

In addition, the fluid pressure P of the upper fluid chamber 15d can be illustrated as the following equation (3):

$$P = K_1 \cdot V_3 \tag{3}$$

As set forth, the suspension control signal value may be illustrated by the following equation (4):

$$V_{4}=a\times Km+a\times Kn \quad (4)$$

where $\alpha$ generally represents bounding and rebounding acceleration and
$\alpha'$ is $\alpha dt$ By replacing components in the equation (1) with the components in the equations (2) to (4), the $Mx_{2y}$ may be illustrated as:

$$Mx_2=K.(x_1-x_2)+K_1(V_1-Km.a-Kn.a').A$$
$$=-(K_1m.A.a+K_1n.A.a+K.x_2)+K.x_1+K_1.A.V_1 \quad (5)$$

The aforementioned equation (5) can be modified by Laplace transformation, as the following equation (6):

$$MS^2 x_2 = -(K_1.Km.A.S^2.x_2+K_1.Kn.A.S.x_2 +K.x_2)$$
$$30\ K.x_1 +K_1.AV_1 \quad (6)$$

Assuming the target vehicle height $V_1$ is zero and disregarding the lateral accelerations, the vibration transmission characteristics $X_2/X_1$ can be illustrated based on the above equation (6), as following equation $$X_2/X_1 =K/(M+K_1.Km.A).S^2+K_1.Kn.A.S+K \ldots \text{(b 7)}$$

Figure 7:
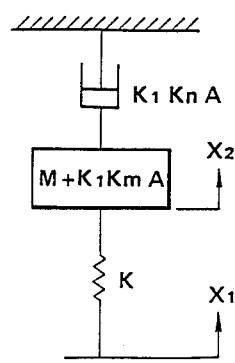
FIG. 7 is an illustration of an equivalent model to be utilized for discussion of operation of the preferred embodiment of the actively controlled suspension system of FIGS. 1 to 5.

The equivalent model of the foregoing equation (7) has been shown in FIG. 7.

Figure 8:
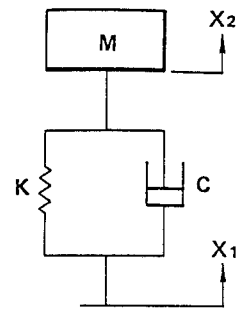
FIG. 8 is a comparative illustration of the equivalent model of the conventional passive suspension system.
Figure 9:
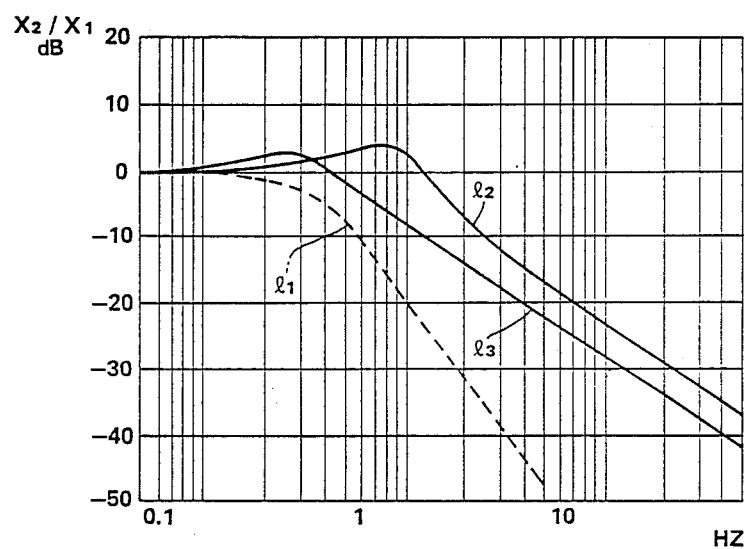
FIG. 9 is a graph showing vibration transmission characteristics in relation to vibration frequency.

The construction of the preferred embodiment of the active suspension system according to the invention will be compared with the conventional type passive suspension system which has been illustrated in FIG. 8. As set forth above, in the shown embodiment, the suspension control signal value is determined on the basis of the bounding and rebounding acceleration $\alpha$ and bounding and rebounding stroke speed Vs which is derived on the basis of the bounding and rebounding acceleration. In this case, the vibration absorbing coefficient $K_1KnA$ of the hydraulic cylinder 15A is disposed between the equivalent mass weight $(M+K_1.Km.A)$ of the vehicle body and stationary section, i.e. the ground. Therefore, by adjusting the fluid pressure P in the upper fluid chamber 15d, the equivalent mass weight of the vehicle body $(M+K_1.Km.A)$ can be directly controlled. The vibration transmission characteristics $X_2/X_1$ with respect to the vibration frequency is shown by the curve $l_1$ in FIG. 9.

As will be seen from FIG. 8. in the conventional passive suspension system, the spring coefficient K of the suspension coil spring and damping coefficient C of the shock absorber are disposed in parallel between the mass weight of the vehicle body to support the vehicle body with forces exerted in parallel. In this case, the vibration transmission characteristics with respect to the vibration frequency $f$ can be illustrated by the curve $l_2$ in FIG. 8. In FIG. 8, the curve $l_3$ represents the vibration transmission characteristics with respect to the vibration frequency $f$ of the conventional active suspension system as set out in the introduction of the disclosure. As will be seen from FIG. 8, the conventional passive suspension system and the conventional active suspension system had peak to vibration transmission at around the resonating frequency, i.e. 1 Hz, of the spring. To the contrary, according to the shown embodiment, vibration transmission can be substantially reduced even at the resonance point of the spring.

Here, as shown in FIG. 11, the gain Kn of the second gain controlled amplifier 37 is variable depending upon the vehicle driving speed as represented by the vehicle speed indicative signal v. Namely, the gain Kn linearly increases according to increasing of the vehicle speed indicative signal value V. This implies that when the vehicle speed is low, the gain Kn is maintained small to make the bounding and rebounding stroke indicative values $V_s$ small. This makes the suspension control signal value greater to reduce pressure in the pressure chamber of hydraulic cylinder 15A to provide soft suspension characteristics. On the other hand, when the vehicle speed is high, the gain Kn is increased to amplify the integrated value of the integrated circuit at a greater magnitude to make the hydraulic pressure in the pressure chamber of the hydraulic cylinder increased to increase stiffness of the suspension for providing driving stability.

Therefore, the shown embodiment may achieve significantly improved riding comfort. On the other hand, the preferred embodiment of the active suspension control system set forth above also may achieve satisfactorily high driving stability by suppressing change of attitude of the vehicle. In addition, since the shown embodiment introduces feature for varying the suspension control signal value depending upon the vehicle driving condition so that the suspension characteristics is sufficiently soft for providing satisfactory riding comfort while the vehicle is driven at relatively low speed and that sufficiently increased stiffness of the suspension can be obtained for high driving stability while the vehicle speed is high. Though the discussion is given only for suppressing vehicular rolling in response to steering operation, the shown embodiment of the active suspension system is successful in suppressing pitching and bouncing motions of the vehicle.

Figure 12:
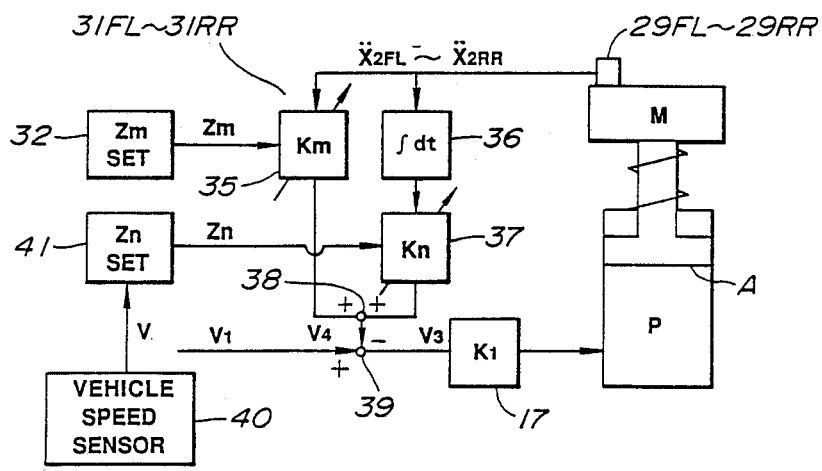
FIG. 12 is a schematic block diagram of the another embodiment of the control section in the controller of the active suspension control system according to the invention.
Figure 13:
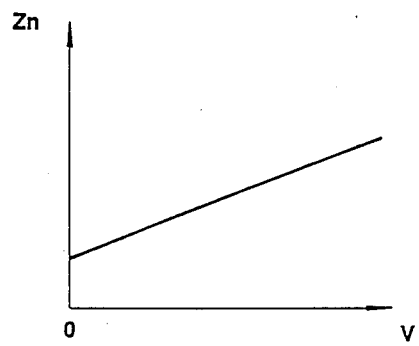
FIG. 13 is a graph showing variation of gain for deriving bounding and rebounding stroke speed dependent value, in relation to spring coefficient of the suspension system in the control section of FIG. 12.
Figure 14:
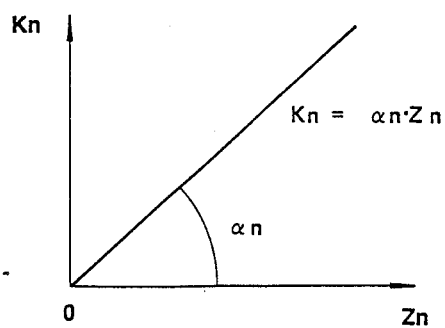
FIG. 14 is a graph showing variation of gain for determining bounding and rebounding stroke speed dependent value, in relation to equivalent mass weight of the vehicle body in the control section of FIG. 12.

FIG. 12 shows another embodiment of the control section 31 to be employed in the suspension control system according to the invention. In this embodiment, the second gain controlled amplifier 37 is connected to another manually operable gain setting unit 41 which is manually operable for setting desired gain by the driver. The gain setting unit produces a gain controlling voltage signal Zn which is variable for varying gain Kn of the second gain controlled amplifier for providing desired bounding and rebounding stroke speed dependent suspension control characteristics as shown in FIG. 14. The gain setting unit 41 is connected to the vehicle speed sensor 40 to receive therefrom the vehicle speed indicative signal V. The gain setting unit 41 varies the gain controlling voltage signal level depending upon the vehicle speed indicative signal value V, as shown in FIG. 13.

Therefore, in comparison with the former embodiment, this embodiment will provide greater flexibility in selecting the suspension control characteristics with incorporating the vehicle speed dependent feature.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, though the shown embodiments are directed to specific embodiments, it may possible to apply for other suspension control systems taking algorithms different from that set forth above. For example, the invention may be applicable for any of the embodiments disclosed in the aforementioned European Patent First Publication No. 0 249 290. Therefore, the disclosure of this European Patent First Publication will be herein incorporated by reference.

Furthermore, the invention is applicable not only for the hydraulic suspension system but also for pneumatic suspension system, hydro-pneumatic suspension system and so forth.

As will be appreciated herefrom, the present invention fulfills all of the objects and advantages sought therefor.

What is claimed is:

1. An actively controlled suspension system for an automotive vehicle comprising:
    a suspension assembly including a variable pressure chamber filled with a working fluid;
    a pressure source connected to said variable pressure chamber for supplying the pressurized working fluid;
    a pressure adjusting means, interposed between said variable pressure chamber and said pressure source, for adjusting fluid pressure in said variable pressure chamber;
    a first sensor means for monitoring vehicular attitude for producing a vehicular attitude indicative signal;
    a second sensor means for monitoring a pre-selected vehicular driving condition indicative parameter to produce a vehicular driving condition indicative signal; and
    a controller receiving said vehicular attitude indicative signal for deriving a first control parameter representative of an acceleration in attitude change and a second control parameter representative of a stroke speed in attitude change on the basis of the vehicular attitude indicative signal, modifying at least one of said first and second control parameters depending upon said vehicular driving condition indicative signal value, and deriving a control signal to suppress attitude change of said vehicle for controlling said pressure adjusting means on the basis of a target vehicular height, said first control parameter and said second control parameter.

2. An actively controlled suspension system as set forth in claim 1 wherein said suspension assembly includes a suspension member rotatably supporting a vehicular wheel, and said variable pressure chamber is disposed between said suspension member and the corresponding section of a vehicle body, and wherein said variable pressure chamber is variable of said fluid pressure therein in response to relatively high frequency vibration input from said suspension member in order to absorb vibration energy.

3. An actively controlled suspension system as set forth in claim 2, wherein said sensor means is provided on said vehicle body for monitoring an acceleration of bounding and rebounding motion of said vehicle body for producing a bounding and rebounding motion acceleration indicative signal as said vehicular attitude indicative signal.

4. An actively controlled suspension system set forth in claim 3, wherein said controller derives a bounding and rebounding motion speed based on said bounding and rebounding acceleration indicative signal values and detects the vehicular attitude change based on said bounding and rebounding acceleration and said bounding and rebounding motion speed for deriving said control signal.

5. An actively controlled suspension system as set forth in claim 4, wherein said controller derives said bounding and rebounding motion speed by integrating said bounding and rebounding acceleration indicative signal value.

6. An actively controlled suspension system as set forth in claim 1, which further comprises a manually operable means for generating a coefficient for deriving at least one of said first and second control parameters on the basis of said vehicular attitude indicative signal.

7. An actively controlled suspension system as set forth in claim 6, wherein said manually operable means varies said coefficient for deriving said first control parameter.

8. An actively controlled suspension system as set forth in claim 1, wherein said second sensor means monitors a vehicle driving speed to produce a vehicle speed indicative signal.

9. An actively controlled suspension system as set forth in claim 8, wherein said controller derives a coefficient on the basis of said vehicle speed indicative signal for modifying said second control parameter.

10. An actively controlled suspension system for an automotive vehicle comprising:
    a suspension assembly provided for suspending a vehicle body on each vehicular wheel, said suspension assembly including a variable pressure chamber filled with a working fluid;
    a pressure source connected to said variable pressure chamber for supplying the pressurized working fluid;
    a pressure adjusting means, interposed between each of said variable pressure chamber and said pressure source, for adjusting fluid pressure in said variable pressure chamber;
    first sensor means for monitoring essentially vertical motion of each suspended section where one of the vehicular wheels is provided, said sensor means producing a vertical motion indicative signals respectively indicative of vertical motions of respective suspended sections;
    second sensor means for monitoring a vehicle driving speed for producing a vehicle speed indicative signal having a value representative of the monitored vehicle speed; and
    a controller receiving said vertical motion indicative signal for deriving a first control parameter based on respective vertical motion indicative signals and a first coefficient and a second control parameters based on respective vertical motion indicative signals and a second coefficient, said controller modifying said second coefficient on the basis of said vehicle speed indicative signal value, and said controller deriving a control signal to suppress vertical motion at respectively corresponding suspended sections of said vehicle for controlling said pressure adjusting means to adjust pressure in respective variable pressure chambers.

11. An actively controlled suspension system as set forth in claim 10, wherein each of said suspension assembly includes a suspension member rotatably supporting said vehicular wheel, and each of said variable pressure chamber is disposed between said suspension member and the corresponding one of suspended sections of said vehicle body, and wherein said variable pressure chamber is variable of said fluid pressure therein in response to relatively high frequency vibration input from said suspension member in order to absorb vibration energy.

12. An actively controlled suspension system as set forth in claim 11, wherein said sensor means is provided on said vehicle body for monitoring an acceleration of bounding and rebounding motion of said vehicle body for producing a bounding and rebounding motion acceleration indicative signal as said vehicular attitude indicative signal.

13. An actively controlled suspension system set forth in claim 12, wherein said controller derives a bounding and rebounding motion speed based on said bounding and rebounding acceleration indicative signal values for detecting bonding and rebounding motion at respective suspended sections of the vehicle body and detects the vehicular attitude change based on said bounding and rebounding acceleration and said bounding and rebounding motion speed for deriving said control signals.

14. An actively controlled suspension system as set forth in claim 13, wherein said controller derives said bounding and rebounding motion speed by integrating said bounding and rebounding acceleration indicative signal value.

15. An actively controlled suspension system as set forth in claim 14, wherein said controller derives said first control parameter representative a bounding and rebounding acceleration dependent component of said control signal based on said bounding and rebounding acceleration indicative signal value and a given first gain corresponding to said first coefficient and a bounding and rebounding motion speed dependent component of said control signal based on said bounding and rebounding motion speed and a given second gain corresponding to said second coefficient.

16. An actively controlled suspension system as set forth in claim 15, wherein said control signal is derived on the basis of a sum of said bounding and rebounding acceleration dependent component and said bounding and rebounding motion speed dependent component and a target vehicular height.

17. An actively controlled suspension system as set forth in claim 10, which further comprises a manually operable means for adjusting at least one of said first and second coefficient.

18. An actively controlled suspension system as set forth in claim 17, wherein said controller derives said control signals for respective pressure adjusting means independently to each other.

19. An apparatus, comprising:
a suspension assembly positioned between a vehicle body and a vehicle wheel, said suspension assembly including a pressure chamber for receiving a working fluid having a variable working pressure;
a pressure source for supplying the working fluid to said suspension assembly;
means connected to said pressure source and said suspension assembly for adjusting the working pressure in said pressure chamber to make said working pressure equal to that indicated by a pressure adjustment control signal;
means for detecting bounding and rebounding acceleration of said body and producing a bounding and rebounding acceleration signal indicative thereof;
means for detecting vehicle speed and producing a vehicle speed signal indicative thereof;
means for producing said pressure adjustment control signal based on said bounding and rebounding acceleration signal modified by said vehicle speed signal, and a target vehicle height indicative signal to suppress bounding and rebounding of the vehicle.

20. An apparatus, comprising:
a suspension assembly positioned between a vehicle body and a vehicle wheel, said suspension assembly including a pressure chamber for receiving a working fluid having a variable working pressure;
a pressure source for supplying the working fluid to said suspension assembly;
means connected to said pressure source and said suspension assembly for adjusting the working pressure in said pressure chamber to make said working pressure equal to that indicated by a pressure adjustment control signal;
means for detecting bounding and rebounding speed of said body and producing a bounding and rebounding speed signal indicative thereof;
means for detecting vehicle speed and producing a vehicle speed signal indicative thereof;
means for producing said pressure adjustment control signal based on said bounding and rebounding speed signal modified by said vehicle speed signal, and a target vehicle height indicative signal to suppress bounding and rebounding of the vehicle.

* * * * *